Patented June 15, 1937

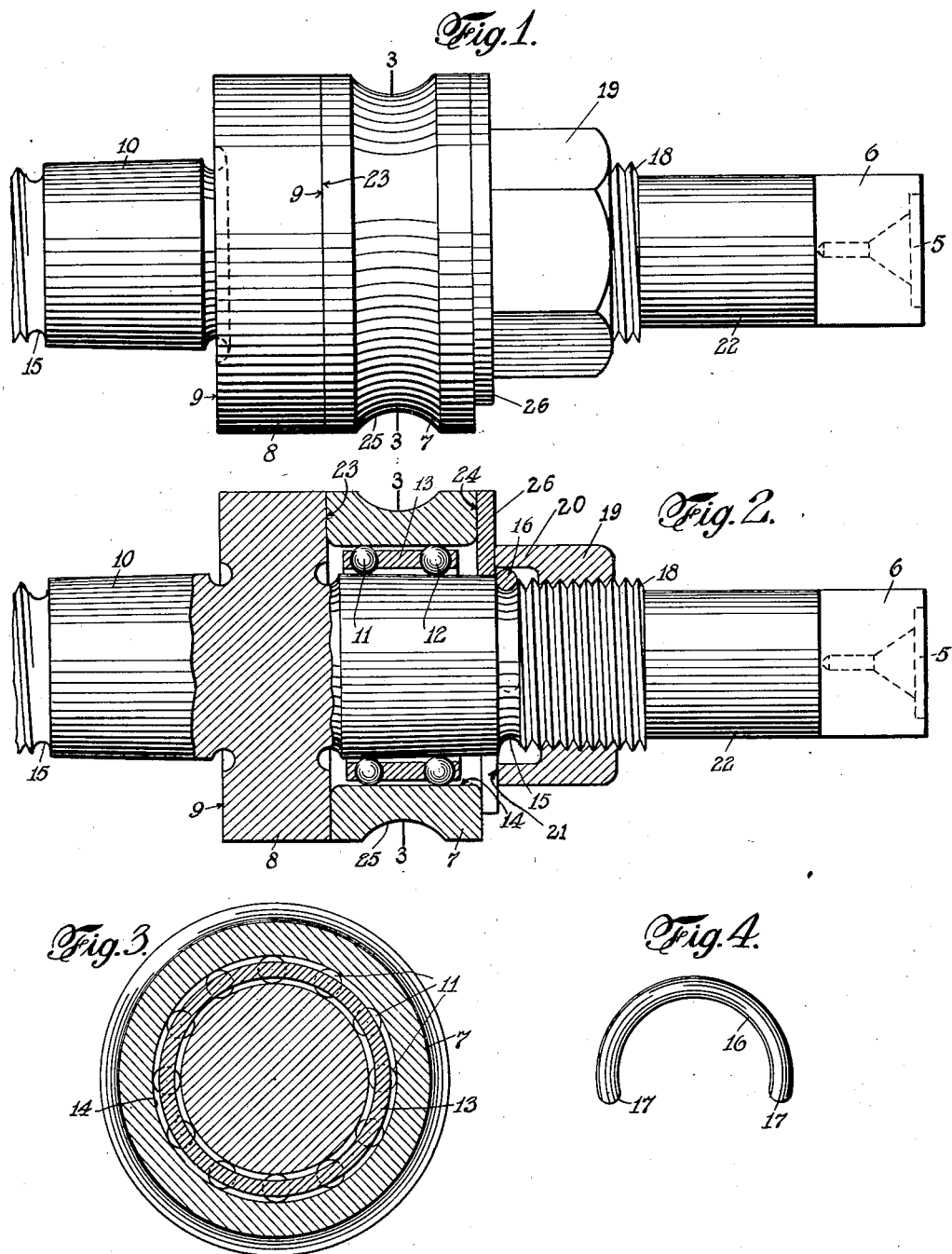

2,084,124

UNITED STATES PATENT OFFICE 2,084,124

CENTERING ARBOR

Harry S. Beckett, Pitman, N. J., assignor to S K F Industries, Inc., Philadelphia, Pa., a corporation of Delaware Application June 4, 1935, Serial No. 24,809

4 Claims. (Cl. 82—44)

This invention relates to a centering arbor, one particularly designed to hold a work piece while the final or finishing grinding operation is performed on its outer surface.

Another object of the invention is to provide an arbor having means for centering a work piece in reference to a back stop face against which the work piece, after being centered or during such centering, is clamped.

Another object of the invention is to provide an arbor having an outwardly directed member provided on each side with a face disposed in a radial plane and respectively associated with a work piece centering and chucking means.

Another object of the invention is to provide a taper face on an arbor upon which face there are mounted two rows of balls, the balls of one row being preferably larger than those in the other so that the outer points of contact lie in a substantially cylindrical plane.

Another object of the invention is to provide on an arbor a back stop face disposed radially of the axis of the arbor and outwardly or in front of this face with a face concentric with such axis preferably formed as a cone having its apex directed away from such face and a series of balls located on such concentric face and adapted to be jammed or deformed between such face and the bore of a work piece when this is clamped against such radial face.

Another object of the invention is to provide such a tapering member and complement of balls in association with a face disposed radially in relation to the arbor, and also associated with a chucking or clamping mechanism.

A further object of the invention is to provide an arbor having two sets of radial positioning and centering devices each furnished with its set or complement of balls mounted in a cage or retainer and associated with a stop device at the smaller end of the tapering face for preventing the balls and their retainer leaving the tapering face, this stop member being preferably formed of spring wire and being readily removable and replaceable.

In the drawing accompanying this specification one practicable embodiment of my invention is illustrated which, I regard at the present time as the preferred form, in which drawing:

Figure 1 shows in elevation a part of my improved arbor having a work piece, namely the inner ring of a ball bearing, centered and clamped in position.

Figure 2 is a view similar to Figure 1, but showing certain of the parts in central, longitudinal section.

Figure 3 is a cross section taken at about the plane 3—3 of Figures 1 and 2, and Figure 4 is a detail showing the spring wire stop member.

In the form of my improved arbor herein illustrated there are two substantially similar ends each of which is preferably provided with a center 5 and flattened sides 6. This arbor is one which is designed to be removed from the centers of the grinding machine and have two work pieces, such as the ball bearing inner rings 7, chucked in position upon it while on the workman's bench and to be then placed upon the centers of the machine.

The arbor is in practice made of some suitable material, such for instance, as properly heat-treated steel. Its central portion is formed as a heavy, outwardly directed body member or flange 8, the side faces 9 of which are carefully ground to a plane disposed radially of the axis of the arbor. Outwardly or in front of these faces the arbor is formed with faces 10 concentric with such axis. In the illustration these faces 10 are shown in the form of cones having their apices directed away from the faces 9. Two sets of balls 11 and 12 are shown mounted on each taper member 10. The balls are preferably retained in a cage 13. The balls of the set 12 are larger in diameter than the balls of the set 11, the diameter of the sets being apportioned to the taper of the member 10 so that the outer points of contact of these balls are disposed on a substantially cylindrical plane for engaging the cylindrical inner surface 14 of the work piece.

If the work piece is tapering, of course the diameter of the balls will be regulated to accommodate such conformation.

Outwardly of the smaller end of the taper there is formed a circumferential groove 15 for receiving a keeper or stop member 16, (see Figure 4), which is preferably a little longer than a half circle so that it may be readily snapped into position after the balls and their retainer have been placed in position and may be readily removed when it is desired to remove the balls. It is shown formed with rounding ends 17 to facilitate its application. When the keeper is in place the balls are prevented from being pushed off the taper 10 upon the removal of the work piece and are also prevented from falling off when the work piece is stood on end in applying a work piece to the other end.

Outwardly of the taper members 10 the arbor is formed with screw threads 18 for receiving a clamping or chucking member 19. This is illustrated as having a portion 20 overhanging a portion of the screw thread and the portion of the arbor carrying the stop member 16. The radial face 21 of the chuck member is accurately ground.

The length of the arbor portions 22 is regulated to accommodate the normal distance apart of the work centers of the grinding machine in which it is to be used.

When it is desired to place work on the arbor, the workman removes both of the chucking members 19. While holding the arbor by one end in his hand he directs the other end somewhat downwardly so that the ball sets run out on the smaller end of the taper member 10 and against the stop 16. He then takes the work piece, as for instance the ring 7, and passes it over the end of the arbor and outside of the balls. Further movement of the ring toward the face 9 causes the balls to roll on the taper face of the member 10 and on the surface 14 of the bore of the ring, thereby centering the ring in relation to the cone surface of the member 10 and eventually bringing the face 23 of the ring against the face 9 of the flange 8.

The operator then holds the ring in such position with his fingers and applies the clamping member 19 to the screw 18 and tightens this up causing its face 21 to engage the face 24 of the ring and press the face 23 tightly against the face 9. When in this position it will be seen that the balls of the sets 11 and 12 are jammed and elastically deformed or should be if the parts are properly proportioned so that the work piece is held rigidly at a number of closely adjacent points, and that it cannot move radially incident to the pressure of the grinding wheel which is used in forming or finishing the groove 25. After one ring has been added the operator reverses the arbor and applies the other ring in a similar manner.

There is preferably interposed between the clamping member 20 and the outer end of the work piece a C shaped plate adapted to overlie the end of the clamping means which is preferably formed of less diameter than the diameter of the circle inscribing the outermost points of the respective rows of balls.

No doubt the operator, in applying the ring 7 to the arbor after introducing the balls into the bore of the ring, will raise that end of the arbor and possibly continue his operation with it in vertical position since it is quite customary to have a holder on the work bench which receives a portion of the part 22 and has a pair of faces for engaging the faces of the slabbed off sides 6 which enable the efficient application of a wrench or spanner to the member 20.

Although but one form of my invention has been illustrated, yet it will be apparent that changes may be made within the scope of the claims without departing from the spirit of the invention.

Having thus described my invention, what I claim and desire to secure by Letters Patent is:

1. As an article of manufacture, an arbor having a body portion formed with a radially disposed back stop face, the portion of the arbor in front of the back stop face being of conical formation sloping away from it, a retaining cage surrounding such portion in front of the back stop face and having a number of circumferential rows of ball pockets, balls in such pockets engaging the portion of the arbor having conical formation and located in position for receiving and centering a work piece, and means for clamping a work piece centered thereby against the back stop face.

2. As an article of manufacture, an arbor having a body portion formed with a radially disposed back stop face, the portion of the arbor in front of the back stop face being of conical formation sloping away from it, a retaining cage surrounding such portion and having a number of circumferential rows of ball pockets, balls in such pockets engaging the conical portions and located in position for receiving and centering a work piece, removable means for preventing the balls running off the conical portion, and means for clamping a work piece centered by the balls against the back stop face.

3. As an article of manufacture, an arbor having a body portion formed with a radially disposed back stop face, the portion of the arbor in front of such back stop face being formed with an outwardly tapering ball engaging face concentric with the axis of the arbor, a retaining cage surrounding such ball engaging face and having two circumferential rows of ball pockets, balls disposed in two circular rows in such pockets for receiving and centering a work piece, the balls in the row nearer the back stop face being of smaller diameter than are the balls of the other row, and means for clamping a work piece centered thereby against the back stop face.

4. As an article of manufacture, an arbor having a body portion formed with a radially disposed back stop face, the portion of the arbor in front of the back stop face being formed with an outwardly tapering ball engaging face concentric with the axis of the arbor, a retaining cage surrounding such ball engaging face and having two circumferential rows of ball pockets, balls disposed in two circular rows for receiving and centering a work piece, the balls of the row nearer the back stop face being of sufficiently smaller diameter than is the diameter of the balls in the other row so that the outer points of contact of the balls shall lie in a substantially cylindrical plane, and means for clamping a work piece centered thereby against the back stop face.

HARRY S. BECKETT.